United States Patent [19]

Beatty, III

[11] 4,105,534
[45] Aug. 8, 1978

[54] APPARATUS FOR REMOVING IMPURITIES FROM ELECTROLYTE SOLUTIONS

[75] Inventor: John C. Beatty, III, Ann Arbor, Mich.

[73] Assignees: John L. Raymond, Fairfield; Robert Z. Reath, Easton, both of Conn.

[21] Appl. No.: 828,638

[22] Filed: Aug. 29, 1977

[51] Int. Cl.² .............................................. B01D 13/02
[52] U.S. Cl. .................................. 204/301; 204/180 P
[58] Field of Search .................... 204/152, 180 P, 301, 204/252, 260, 172, 282

[56] References Cited

U.S. PATENT DOCUMENTS

| 2,795,541 | 6/1957 | Muller | 204/260 X |
| 2,997,430 | 8/1961 | Föyn | 204/260 X |
| 3,909,381 | 9/1975 | Ehrsam | 204/180 P |
| 3,920,534 | 11/1975 | Jensen et al. | 204/282 |
| 3,984,303 | 10/1976 | Peters et al. | 204/260 |

Primary Examiner—Arthur C. Prescott
Attorney, Agent, or Firm—Pennie & Edmonds

[57] ABSTRACT

Apparatus for removing ionic impurities from an electro-plating bath and similar electrolyte solutions by electrodialysis of the solution comprises a special electrolytic cell having a generally tubular anode, a generally tubular cathode and a generally tubular permselective membrane that are disposed concentrically with respect to each other, the generally tubular permselective membrane being positioned between the tubular anode and the tubular cathode. Additionally, the cell is provided with longitudinally movable scraper means for removing precipitated particulate matter from the surface of one of the generally tubular electrodes (that is, from the surface of the anode or the cathode) facing the permselective membrane. The generally tubular anode and permselective membrane together define a generally annular anolyte compartment through which an anolyte solution can be circulated, and the generally tubular cathode and permselective membrane together define a generally annular catholyte compartment through which a catholyte solution can be circulated. If the ionic impurities to be removed from the electrolyte solution are anions the permselective membrane is an anion permeable material and the solution being treated serves as the anolyte solution in the cell, and if the ionic impurities are cations the permselective membrane is a cation permeable material and the solution being treated serves as the catholyte solution in the cell.

19 Claims, 6 Drawing Figures

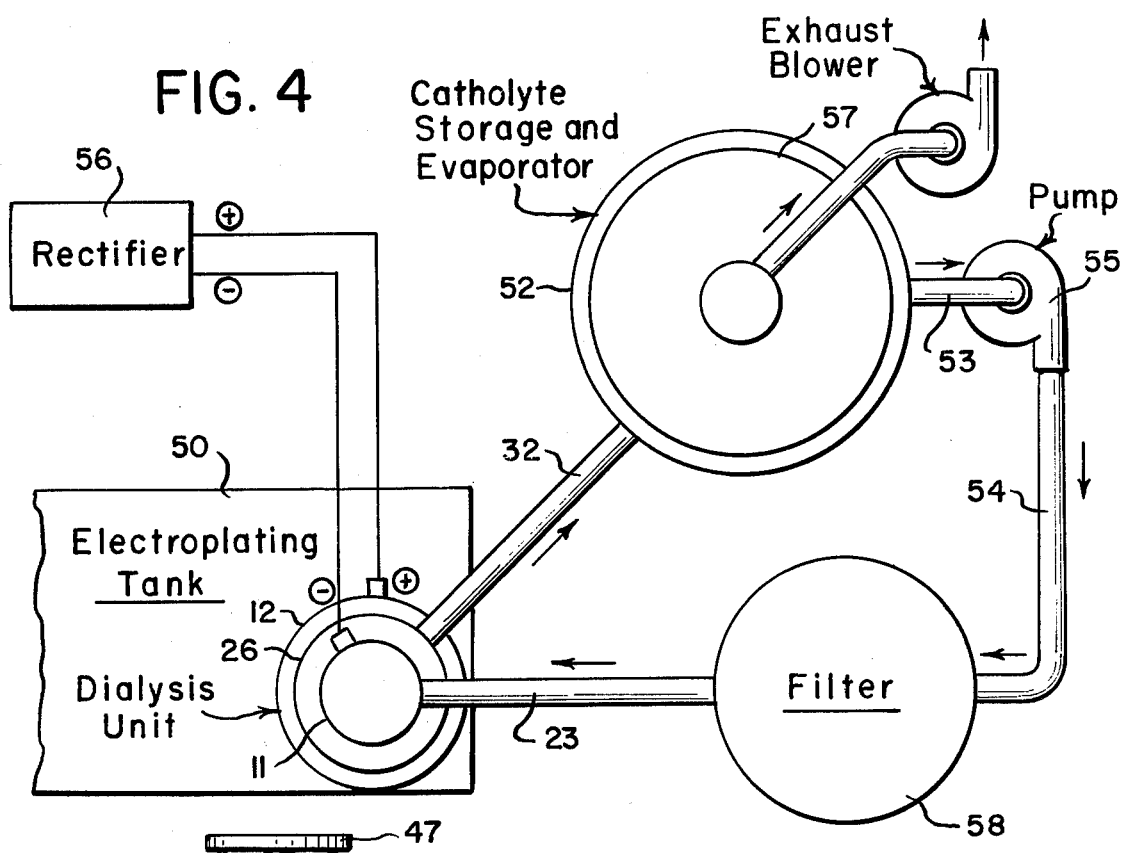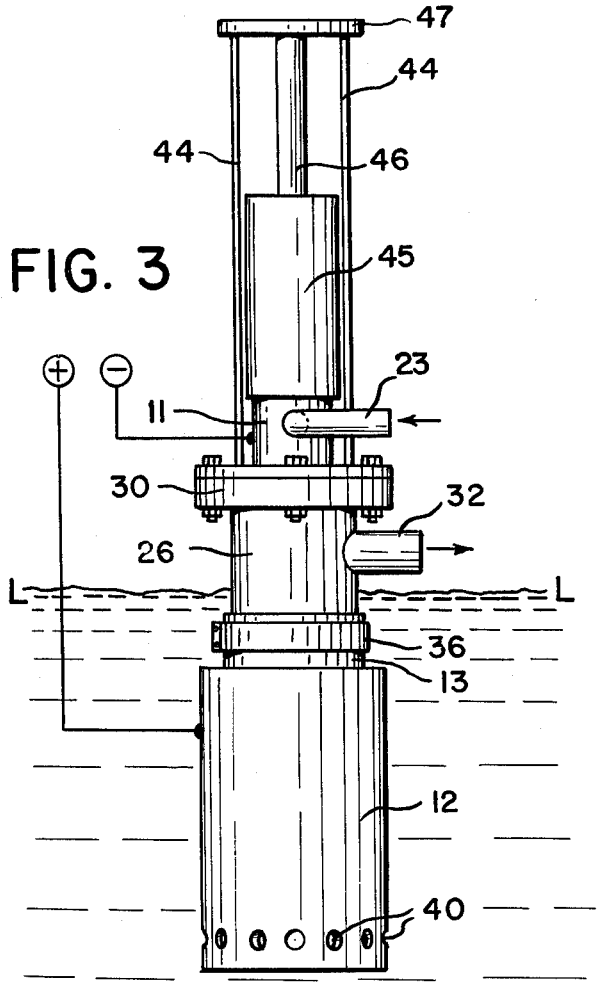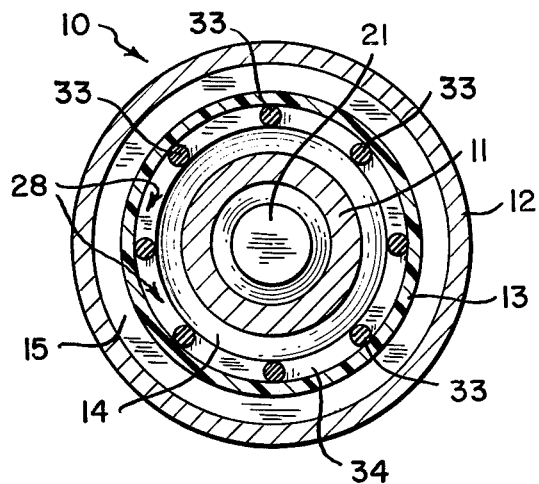

APPARATUS FOR REMOVING IMPURITIES FROM ELECTROLYTE SOLUTIONS

BACKGROUND OF THE INVENTION

1. Field of the Invention

This invention relates to apparatus for removing ionic impurities from electroplating baths and similar electrolyte solutions, and in particular to a special electrolytic cell that is adapted to remove these impurities when immersed in the electrolyte solution being purified.

2. Prior Art

Electrodialysis is a process that involves the transport of ions through a ion permeable membrane as a result of an electrical driving force, and the process is commonly employed to remove unwanted ions or ionic impurities from aqueous electrolyte solutions — as, for example, in the desalinization of brines and the like. The process is commonly carried out in an electrodialysis cell having an anolyte compartment and a catholyte compartment separated by a permselective membrane, the anolyte compartment and the catholyte compartment each containing an electrolyte solution. If the ionic impurities are anions (for example, mineral acid ions), the permselective membrane is an anion permeable material and the solution to be purified is placed in the catholyte compartment of the cell. The passage of an electric current between the anode and the cathode of the cell causes the contaminant anions present in the catholyte solution to migrate from the catholyte through the anion permeable membrane into the electrolyte solution (the anolyte) contained in the anolyte compartment, the reverse migration of cations from the anolyte solution into the catholyte solution being largely prevented by the anion permeable membrane. Similarly, if the ionic impurities are cations (for example, metal ions), the permselective membrane is a cation permeable material and the solution to be purified is placed in the anolyte compartment of the cell. The passage of an electric current between the anode and the cathode of the cell causes the contaminant cations present in the anolyte solution to migrate from the anolyte through the cation permeable membrane into the electrolyte solution (the catholyte) contained in the catholyte compartment, reverse migration of anions from the catholyte solution into the anolyte solution being largely prevented by the cation permeable membrane.

By way of example, it has heretofore been proposed in U.S. Pat. No. 3,909,381 to Robert F. Ehrsam that certain harmful metal impurities (principally, iron and copper ions) be removed from chromium plating solutions by electrodialysis of the solution. In this process the chromium plating solution to be purified comprises the anolyte solution and an ionizable organic compound having the characteristics described in the patent comprises the catholyte solution, the anolyte and catholyte solutions being separated from each other by a cation permeable membrane. When an electrolyzing current is passed between the anode and the cathode of the cell, the unwanted ferric and cupric ions migrate from the chromium plating solution contained in the anolyte compartment through the cation permeable membrane into the catholyte solution contained in the catholyte compartment, reverse migration of anions from the catholyte solution into the anolyte solution being largely prevented by the cation permeable membrane.

The electrodialysis process described in the Ehrsam patent removes cationic impurities from chromium plating solutions efficiently and economically. However, it has been found that the ferric and cupric anions that are caused to migrate into the catholyte solution are there reduced to lower valent forms that tend to precipitate from the catholyte solution. Chelating agents can be added to the catholyte solution to substantially prevent the precipitation of iron and, to a lesser extent, inhibit the precipitation of copper from the solution. However, it is difficult to prevent entirely the precipitation of metallic copper, and finely divided particles of this metal tend to be electrodeposited on the surface of the cathode and to be precipitated from the catholyte solution in the immediate vicinity of the cathode where they can have a serious disruptive effect on the operation of the electrodialysis cell. Moreover, it has been found that the process is difficult to carry out in conventional electrodialysis cells due to the corrosive nature of the anolyte solution and the need for frequent interruption of the process for disassembly and cleaning of the catholyte compartment of the cell.

After an intensive investigation of the problems caused by the precipitation of deleterious materials on and in the immediate vicinity of the electrodes of an electrodialysis cell and the consequent need to interrupt the electrodialysis process for disassembly and cleaning of the cell, I have devised a novel electrolytic cell for removing ionic impurities from electrolyte solutions by electrodialysis of the solution, the cell being provided with means for mechanically removing precipitated particulate material from the anode or the cathode of the cell, as hereinafter described, without the need for frequent disassembly of the cell to remove the precipitated material. The electrodialysis cell I have devised is efficient and reliable in operation and is applicable to the purification of all types of electrolytic solutions wherein the aforementioned problems exist.

SUMMARY OF THE INVENTION

The apparatus I have devised for removing ionic impurities from electroplating baths and other electrolyte solutions by electrodialysis of the solution comprises an electrolytic cell having an innermost generally tubular electrode, a generally tubular permselective membrane disposed concentrically with respect to the innermost tubular electrode and spaced radially outwardly from the outer surface thereof, and an outermost generally tubular electrode disposed concentrically with respect to the innermost electrode and the permselective membrane and spaced radially outwardly from the outer surface of the permselective membrane. Longitudinally movable scraper means are provided for removing precipitated particulate matter from the surface of one of the generally tubular electrodes facing the permselective membrane, and scraper drive means are provided for moving the scraper means longitudinally with respect to the said tubular electrode in contact with the said surface thereof. The innermost generally tubular electrode and the permselective membrane together define a generally annular innermost electrolyte compartment through which a first electrolyte solution can be circulated, and the outermost generally tubular electrode and the permselective membrane together define a generally annular outermost electrolyte compartment through which a second electrolyte solution can be circulated. In addition, means are advantageously provided for circulating the first electrolyte solution through the innermost generally annular electrolyte compartment and for circulating the second electrolyte solution through the outermost generally annular electrolyte compartment of the cell.

The innermost generally tubular electrolyte may comprise either the anode or the cathode of the cell, the outermost generally tubular electrode then comprising the electrode of opposite polarity. In addition, the generally tubular permselective membrane may be either a cation permeable material or an anion permeable material, depending on whether the ionic impurities to be removed from the electrolyte solution are cations or anions. The cell is advantageously provided with a generally tubular housing of imperforate material on which the generally tubular permselective membrane is mounted, the tubular housing being disposed concentrically between the innermost and the outermost of the tubular electrodes of the cell and being formed with a plurality of through openings on the portion thereof on which the tubular permselective membrane is mounted.

The electrolyte cell is advantageously adapted to be at least partly immersed in the electrolyte solution being purified so that the outermost concentrically disposed generally tubular electrode is totally immersed in said solution. Alternatively, the electrolyte cell may be provided with an outer housing in which the outermost of the generally tubular electrodes of the cell is contained, means being provided for introducing the electrolyte solution being purified into the outer housing and for discharging said solution from said outer housing. Other advantageous features of my new electrodialysis apparatus will become apparent from the following detailed description thereof.

BRIEF DESCRIPTION OF THE DRAWINGS

The apparatus of the invention for removing ionic impurities from electrolyte solutions will be better understood from the following description thereof in conjunction with the accompanying drawings of which:

FIG. 2 is a sectional view along line 2—2 of FIG. 1;

FIG. 3 is a side elevation of the electrolytic cell of FIG. 1 showing the scraper drive means mounted on top of the cell, and also showing the outermost tubular electrode immersed in the solution being treated;

FIG. 4 is a semi-schematic plan view of an advantageous arrangement of apparatus for removing ionic impurities from an electrolyte solution employing the electrolytic cell of FIG. 3;

DETAILED DESCRIPTION

Figure 1:
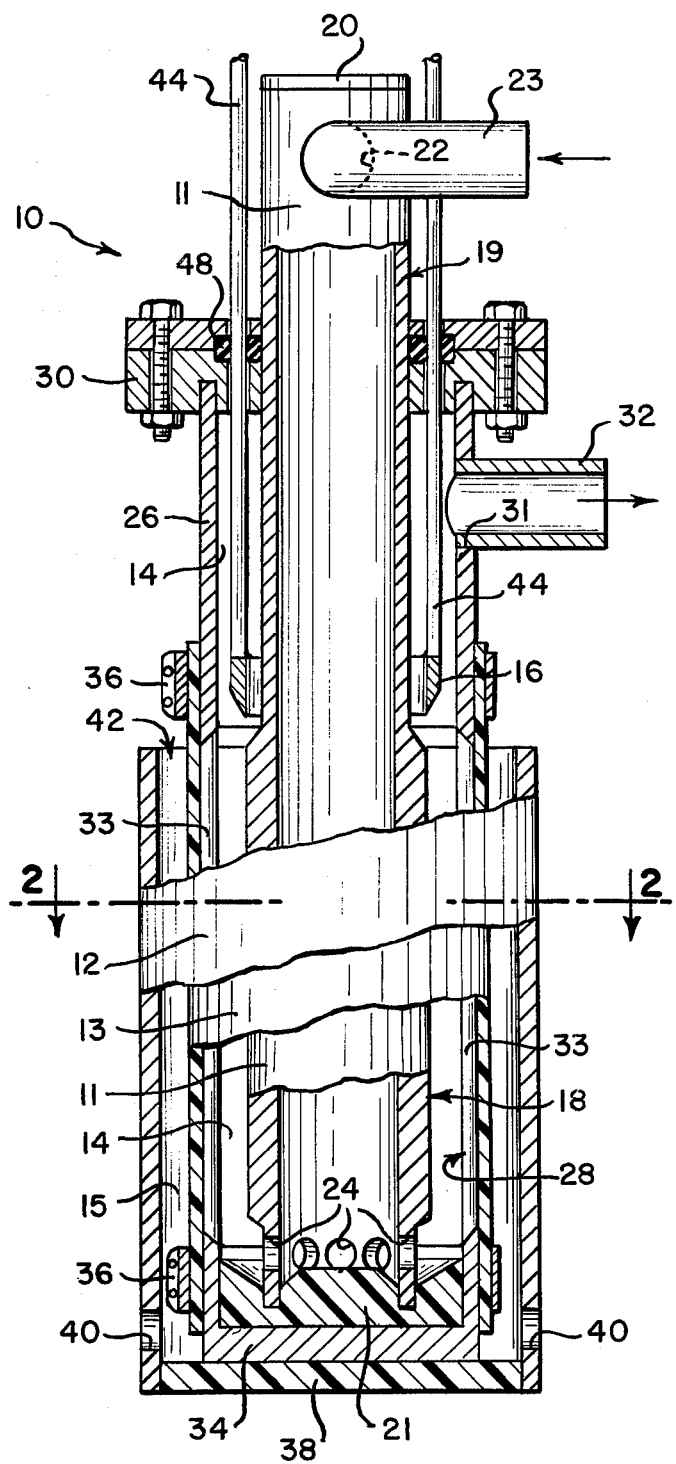
FIG. 1 is a side elevation, partly in section, of an advantageous embodiment of the electrolytic cell employed the practice of the invention.

The apparatus of the invention is designed to remove ionic impurities from an electroplating bath or a similar electrolyte solution by electrodialysis of the solution and comprises a special electrolytic cell that in one advantageous mode of operation is adapted to be at least partly immersed in the solution being treated. As shown best in FIGS. 1 and 2 of the drawings, the electrolytic cell 10 has two generally tubular electrodes 11 and 12 arranged concentrically with respect to each other, one of the electrodes 11 or 12 serving as the anode of the cell 10 and the other of the electrodes 11 or 12 serving as the cathode of the cell as hereinafter explained. A generally tubular permselective membrane 13 is disposed concentrically between the two tubular electrodes 11 and 12 of the cell, the concentrically arranged tubular parts of the cell being spaced radially apart from each other so that the innermost electrode 11 and the permselective membrane 13 together define a generally annular innermost electrolyte compartment 14 through which a first electrolyte solution can be circulated and so that the permselective membrane 13 and the outermost electrode 12 together define a generally annular outermost electrolyte compartment 15 through which a second electrolyte solution can be circulated. The cell 10 is also provided with longitudinally movable scraper means 16 that, in the embodiment shown in FIG. 1, is adapted to remove precipitated particulate material from the outer surface of the innermost electrode 11 of the cell, or that, in the embodiment shown in FIG. 6, is adapted to remove precipitated particulate material from the inner surface of the outermost electrode 12 of the cell.

Figure 5:
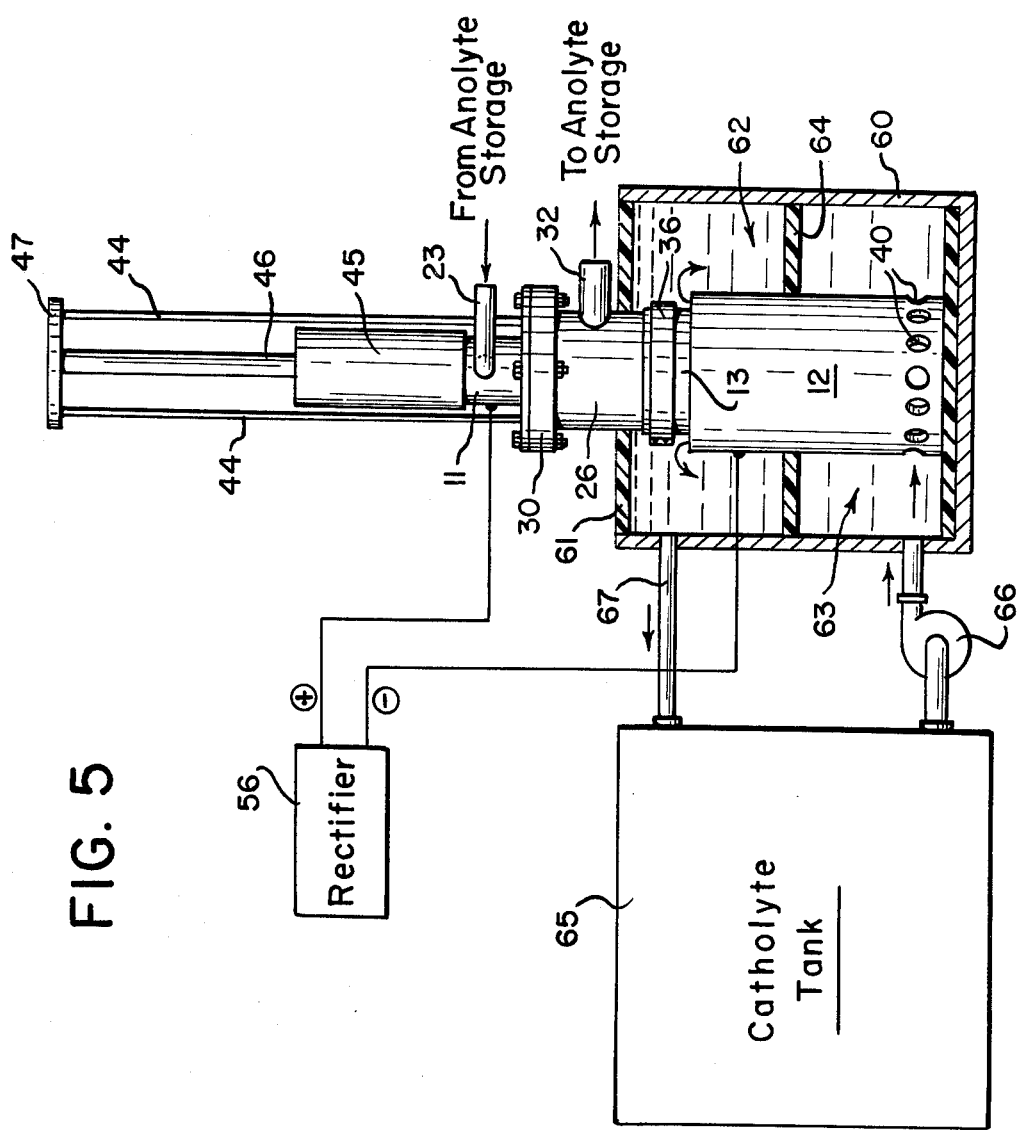
FIG. 5 is a side elevation, partly in section, of a modification of the apparatus in which the outermost tubular electrode is contained within a housing which an electrolyte solution is circulated.

The outermost tubular electrode 12 may be completely immersed in the electrolyte solution being treated so that the solution will enter and fill the outermost annular electrolyte compartment 15 of the cell 10 as shown in FIGS. 3, 4, and 5 of the drawings in which case an ionic impurity-receiving electrolyte solution is circulated through the innermost annular electrolyte compartment 14 of the cell is also indicated in the drawings. If, as shown in FIGS. 3 and 4 of the drawings, the solution being treated contains cationic impurities, the outermost electrode 12 serves as the anode of the cell, the innermost electrode 11 serves as the cathode of the cell and a cationic permeable material is employed for the permselective membrane 13. The passing of an electrolytic current between the two electrodes 11 and 12 causes the cationic impurities in the solution being treated (the anolyte solution) to migrate from this solution through the cation permeable membrane 13 into the impurity-receiving solution (the catholyte solution) where these cationic impurities are reduced to lower valent forms that tend to precipitate from the catholyte solution. If, as shown in FIG. 5 of the drawings, the solution being treated contains anionic impurities, the outermost electrode 12 serves as the cathode of the cell, the innermost electrode 11 serves as the anode of the cell and an anion permeable material is employed for the permselective membrane 13. The passing of an electrolytic current between the two electrodes 11 and 12 causes the anionic impurities in the solution being treated (the catholyte solution) to migrate from this solution through the anion permeable membrane 13 into the impurity-receiving solution (the anolyte solution) where the anionic impurities are oxidized to higher valent forms that tend to precipitate from the anolyte solution. The finely divided particle of material that tend to precipitate from the impurity-receiving solution on or in the vicinity of the innermost tubular electrode 11 are periodically removed from the outer surface of this electrode by the longitudinally movable scraper means 16 as hereinafter more fully described.

Figure 6:
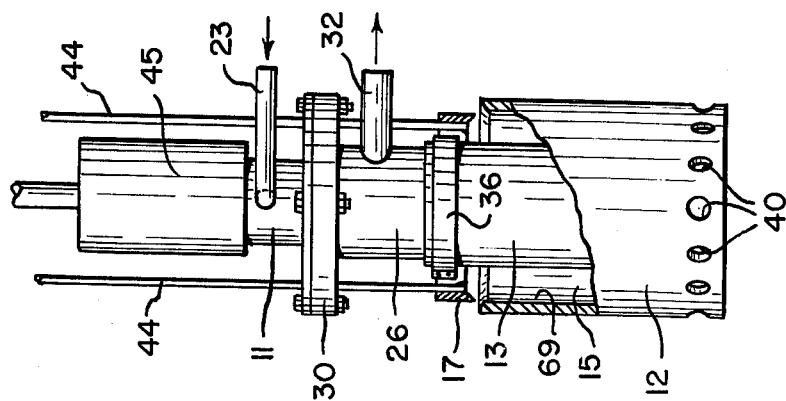
FIG. 6 is a side elevation, partly in section, of a modification of the electrolytic cell in which the annular scraper is adapted to contact the inner surface of the outermost tubular electrode of the cell.

Alternatively, the electrolye solution being treated may be circulated through the innermost annular electrolyte compartment 14 of the cell 10 as shown in FIG. 6 of the drawings in which case the outermost tubular electrode 12 is immersed in the ionic impurity-receiving electrolyte solution so that this solution will enter and fill the outermost annular electrolyte compartment 15 of the cell. More particularly, if the solution being treated contains cationic impurities, the innermost electrode 11 serves as the anode of the cell, the outermost electrode 12 serves as the cathode of the cell and a cation permeable material is employed for the permselective membrane 13. The passing of an electrolytic current between the two electrodes 11 and 12 causes the cationic impurities in the solution being treated (the anolyte solution) to migrate from this solution through the cation permeable membrane 13 into the impurity-receiving solution (the catholyte solution) contained in the outermost electrolyte compartment 15 where the cationic impurities are reduced to lower valent forms that tend to precipitate from the catholyte solution. If the solution being treated contains anionic impurities, the innermost electrode 11 serves as the cathode of the cell, the outermost electrode 12 serves as the anode of the cell and an anion permeable material is employed for the permselective membrane 13. The passing of an electrolytic current between the two electrodes 11 and 12 causes the anionic impurities in the solution being treated (the catholyte solution) to migrate through the anion permeable membrane 13 into the impurity-receiving solution (the anolyte solution) contained in the outermost electrolyte compartment 15 where the anionic impurities are oxidized to higher valent forms that tend to precipitate from the anolyte solution. The finely divided particles of material that tend to precipitate from the impurity-receiving solution on or in the vicinity of the outermost tubular electrode 12 are periodically removed from the inner surface of this electrode by the longitudinally movable scraper means 17 as hereinafter more fully described.

The apparatus of the invention will be described below with reference to a preferred embodiment thereof that is specifically adapted to carry out the electrodialysis process for removing cationic impurities from chromium electroplating baths disclosed in U.S. Pat. No. 3,909,381 to Ehrsam. In the embodiment shown in FIGS. 1 through 4 of the drawings, the innermost tubular electrode 11 comprises the cathode of the electrolytic cell 10, the outermost tubular electrode 12 comprises the anode of the cell, and the permselective membrane 13 is formed of a cation permeable material. Specifically, the innermost electrode or cathode 11 comprises an elongated tubular member of electrically conductive material (for example, stainless steel or titanium) that is adapted to be mounted so that the longitudinal axis thereof is substantially vertically disposed. The outer surface of the lower portion 18 of cathode 11 facing the cation permeable membrane 13 is the cathodically active portion of the cathode, the upper portion 19 of the cathode 11 being essentially cathodically inactive when the cell is in operation and serving mainly as a support for the other parts of the cell and as a conduit for the catholyte solution circulated therethrough. The top end of the tubular cathode 11 is closed by means of a top closure member 20 and the bottom end of the tubular cathode is closed by a bottom closure member 21 of an non-conductive material. The upper end of the cathode 11 is formed with a catholyte inlet opening 22 that communicates with the interior of the cathode, and the lower end of the cathode is formed with a plurality of catholyte outlet openings 24 that communicate with the annular catholyte compartment 14 so that a catholyte solution can be circulated through the catholyte compartment as hereinafter described.

A generally tubular housing 26 is disposed concentrically with respect to the tubular cathode 11 and is spaced radially outwardly therefrom, the upper portion of the tubular housing 26 being substantially imperforate and the lower portion of the housing being formed with a plurality of longitudinally extending openings 28. In the embodiment shown in the drawings the top end of the tubular housing 26 is closed by the annular top closure member 30 which also serves to support and position the housing 26, and the bottom end of the tubular housing 26 is closed by the bottom closure member 21 which also serves to position the housing 26 with respect to the cathode 11. The upper end of the tubular housing 26 is formed with a catholyte discharge opening 31 that communicates with the annular catholyte compartment 14 and to which is connected a catholyte discharge conduit 32. As shown best in FIG. 2, the longitudinally extending openings 28 are advantageously defined by a plurality of longitudinally extending circumferentially spaced rods 33 that are secured at their upper ends to the imperforate upper portion of the tubular housing 26 and at their lower ends to an imperforate lower end closure member 34 of the housing 26. The tubular permselective membrane 13 is mounted on the exterior of the lower portion of the tubular housing 26 over the longitudinal openings 28 formed in this portion of the housing, the permselective membrane being secured in fluid tight engagement to the exterior of the housing 26 by the clamps 36. The tubular cathode 11 and the tubular housing 26 with the tubular permselective membrane 13 mounted thereon together define the generally annular catholyte compartment 14 through which the catholyte solution can be circulated in contact with both the exterior surface of the cathode 11 and the interior surface of the permselective membrane 13 as hereinafter described.

The permselective membrane 13 comprises a tubular sleeve formed from a thin sheet or film of cation permeable material. The cation permeable material is not unlike a chemically inert ion exchange resin throughout the polymer latice of which are distributed chemically or physically bound anionic moieties having a fixed negative charge. In addition to its cation permeable properties the membrane 13 should be strongly hydrophilic, it should be a reasonable good electrical conductor and should have adequate physical strength when immersed in electrolyte solutions, and in the present embodiment it should be resistant to attack by the chromic acid containing anolyte solution. There are a number of such anion permeable and cation permeable membrane materials available from commercial suppliers. In the present case I presently prefer to use a perfluorosulfonic acid membrane manufactured by DuPont and sold under the name "Nafion".

The outermost tubular anode 12 of the cell 10 comprises a tubular member of an electrically conductive material (for example, lead) that is resistant to attack by the highly corrosive chromium plating bath in which it is designed to be immersed. The bottom end of the tubular anode 12 is closed by a bottom closure plate 38 of non-conductive material that also serves to support the anode 12 and to position it with respect to the other tubular parts of the cell. The lower end of the tubular anode 12 is formed with a plurality of anolyte inlet openings 40 and the upper end of the anode is open so as to provide an annular anolyte discharge opening 42 at the upper end of the anode. As a consequence, the chromium plating bath being treated can enter and fill the annular anolyte compartment 15, the chromium plating bath (which comprises the anolyte solution in the Ehrsam process) being circulated through the anolyte compartment 15 in contact with the inner surface of the anode 12 and the outer surface of the permselective membrane 13 when the cell is in operation.

As shown best in FIG. 1, the annular scraper 16 is normally positioned in the annular catholyte compartment 14 above the cathodically active outer surface of the lower portion 18 of the tubular cathode 11. The scraper 16 is mounted on at least two scraper drive rods 44 and is adapted to be moved downwardly across the outer surface of the lower portion 18 of the cathode in scraping contact therewith to remove precipitated particulate material that tends to accumulate thereon when the cell is in operation. As shown best in FIG. 3, scraper drive means are provided for moving the annular scraper 16 in reciprocating fashion across the outer surface of the lower portion 18 of the cathode, the scraper drive means advantageously comprising pneumatically operated piston drive means 45 having a piston rod 46 that extends upwardly to a scraper drive crosshead 47. The scraper drive rods 44 are connected at their lower ends to the annular scraper 16 and at their upper ends to the scraper drive crosshead 47. Gasket means 48 are provided to prevent leakage of catholyte solution at the points where the scraper drive rods 44 pass through the annular top closure member 30 of the electrolytic cell. When the scraper drive means 45 is actuated, the piston rod 46, scraper drive crosshead 47 and scraper rods 44 are moved downwardly, thereby causing the annular scraper ring 16 to move downwardly and to scrape precipitated particulate matter from the outer surface of the lower portion 18 of the cathode 11. On completion of the downward movement of the scraper 16, the drive means 45 returns the scraper to its normal position as shown in FIG. 1. The scraper drive means can be actuated manually by the operator of the apparatus, or it can be actuated automatically at predetermined intervals of time by timer means in the manner known in the art.

The operation of the apparatus is shown semischematically in FIG. 4 of the drawings. The electrolytic cell 10 is immersed directly in the electrolyte solution being treated (for example, a chromium electroplating bath) contained in the electroplating tank 50 shown in FIG. 4, the cell 10 being immersed in the solution up to about the line L—L shown in FIG. 3 of the cell drawing so that the solution enters and fills the annular anolyte compartment 15 of the cell. Means are provided for introducing an ionic impurity-receiving catholyte solution into the interior of the tubular cathode 11 through the catholyte inlet conduit 23 and inlet opening 22 of the cell. Advantageously, a catholyte storage tank 52 is provided to collect and store the catholyte solution, the solution being delivered to the interior of the cathode 11 through the conduits 53, 54 and 23 by the pump 55. The catholyte solution flows downwardly through the cathode 11 and then outwardly through the catholyte outlet openings 24 into the annular catholyte compartment 14 of the cell. From there the catholyte solution flows upwardly through the catholyte compartment 14 and is discharged therefrom through the catholyte discharge opening 31. The catholyte solution is then returned through the conduit 32 to the catholyte storage reservoir 52 for further use.

When an electrolyzing current from the rectifier 56 is passed between the anode 12 and the cathode 11 of the cell, the cationic impurities (for example, iron and copper ions) contained in the anolyte solution in the anolyte compartment 15 migrate from the anolyte compartment through the cation permeable membrane 13 into the impurity-receiving catholyte solution contained in the catholyte compartment 14 of the cell. The electrolytic reaction at the anode 12 results in the evolution of a considerable quantity of gas (mainly oxygen), and the evolving gas bubbles cause the anolyte solution in the anolyte compartment 15 to be moved or pumped upwardly and out through the opening 42, fresh anolyte solution entering the anolyte compartment through the anolyte inlet openings 40. As a result, the electrolyte solution being treated is vigorously circulated through the anolyte compartment 15 of the cell.

The electrolytic reaction at the cathode 11 also results in the evolution of gas (mainly hydrogen), but is also results in the reduction of the highly oxidized metal cations that migrate there from the anolyte into lower valent or metallic forms. These lower valent metal cations, and the metals themselves, tend to precipitate from the catholyte solution in the catholyte compartment 14 of the cell in finely divided particulate form. Most of the precipitated particulate material remains in suspension in the catholyte solution and is removed from the catholyte compartment with the solution. However, a significant proportion of the precipitated material is deposited on the cathodically active surface 18 of the cathode 11, and if allowed to remain there undisturbed this precipitated particulate material would soon build up in a layer of sufficient thickness so as to seriously interfere with, if not disrupt completely, the electrodialysis operation.

The precipitated particulate material that deposits on the cathodically active surface of the cathode 11 must be removed therefrom periodically to avoid an undesirable buildup of this deposit. To do this, the electrolyzing current is turned off, and then the scraper drive means 45 is actuated to cause the annular scraper 16 to move downwardly and physically scrape the particulate material from the surface of the cathode 11. The scraper 16 is then returned to its normal position as shown in FIG. 1, and the electrolyzing current is again turned on. As previously mentioned, the scraper drive means 45 can be actuated manually by the operator of the apparatus, or it can be actuated automatically at predetermined intervals of time by timer means in the manner known in the art.

The particulate material scraped from the surface of the cathode 11 becomes suspended in the catholyte solution being circulated through the catholyte compartment 14 and is removed from the catholyte compartment with the catholyte solution. As noted, the catholyte solution discharged from the catholyte compartment 14 is delivered to the catholyte storage reservoir 52. A small but appreciable quantity of water from the anolyte solution being treated tends to migrate through the permselective membrane 13 into the catholyte solution, and this excess water must be removed from the catholyte solution to prevent undesirable dilution of the solution. Accordingly, the catholyte storage reservoir 52 is advantageously provided with an evaporator section 57 through which the catholyte solution is circulated to effect the evaporation of excess water therefrom. In addition, a filter 58 is advantageously provided for the catholyte solution to remove precipitated particulate matter from the catholyte solution before the solution is reintroduced into the catholyte compartment of the electrolytic cell 10.

It is sometimes inconvenient to position the electrolytic cell 10 directly in the electroplating tank 50, or other similar vessel containing the solution being treated, as shown in FIGS. 3 and 4 of the drawings. Accordingly, in the embodiment of the apparatus shown in FIG. 5, the electrolytic cell 10 is provided with its own outer casing or housing 60 to which the solution being treated is delivered for electrodialysis treatment as hereinafter described. The outer housing 60 is closed at its bottom end and is provided with a top closure member 61 to define a small container or vessel in which the outermost tubular electrode 12 of the cell is contained. The annular space between the outermost electrode 12 and the outer housing 60 is advantageously divided into upper and lower electrolyte compartments 62 and 63 by the horizontal partition 64. Most of the solution being treated is contained in the tank 65, a minor portion thereof being continuously delivered to the lower compartment 63 of the housing 60 by the pump 66. The solution delivered to the lower compartment 63 enters the outermost annular electrolyte compartment 15 of the cell 10 through the solution inlet openings 40 formed in the outermost electrode 12 and flows upwardly though the annular compartment 15 into the upper electrolyte compartment 62 of the housing 60. The solution being treated is then returned to the tank 65 through the conduit 67.

If the solution being treated contains cationic impurities the outermost tubular electrode 12 serves as the anode of the cell, the innermost tubular electrode 11 serves as the cathode of the cell, and a cation permeable material is employed for the permselective membrane 13 as hereinbefore described. Conversely, if the solution being treated contains anionic impurities, the outermost electrode 12 serves as the cathode of the cell, the innermost electrode 11 serves as the anode of the cell, and an anion permeable material is employed for the permselective membrane 13 as shown in FIG. 5 of the drawings. In this case the solution being treated is the catholyte and the ionic impurity-receiving solution is the anolyte in the electrodialysis process.

In the embodiment of the apparatus shown in FIG. 6, the solution being treated is introduced into the interior of the innermost tubular electrode 11 through the electrolyte inlet conduit 23, the solution flowing downwardly through the innermost tubular electrode 11 and then upwardly through the innermost annular electrolyte compartment 14 from which it is discharged through the solution discharge conduit 32 as previously described. The outermost tubular electrode 12 of the cell is immersed in the ionic impurity-receiving solution. As previously pointed out, if the solution being treated contain cationic impurities, the innermost tubular electrode 11 serves as the anode of the cell, the outermost tubular electrode 12 serves as the cathode of the cell and a cation permeable material is employed for the permselective membrane 13. Conversely, if the solution being treated contains anionic impurities, the innermost electrode 11 serves as the cathode of the cell, the outermost electrode 12 serves as the anode of the cell, and an anion permeable material is employed for the permselective membrane 13. In either case, the finely divided particulate material that precipitates from the ionic impurity-receiving solution on or in the vicinity of the inner surface 69 of the outermost electrode 12 is periodically scraped therefrom by the annular scraper means 17.

I claim:

1. Apparatus for removing ionic impurities from an electrolyte solution by electrodialysis of the solution which comprises an electrolytic cell having an innermost generally tubular electrode that is adapted to be mounted so that the longitudinal axis thereof is substantially vertically disposed, a generally tubular permselective membrane disposed concentrically with respect to the innermost generally tubular electrode and spaced radially outwardly from the outer surface thereof, an outermost generally tubular electrode disposed concentrically with respect to the innermost generally tubular electrode and the generally tubular permselective membrane and spaced radially outwardly from the outer surface of said permselective membrane, and longitudinally movable scraper means for removing precipitated particulate matter from the surface of one of said generally tubular electrodes facing the permselective membrane, the innermost generally tubular electrode and the permselective membrane together defining a generally annular innermost electrolyte compartment through which a first electrolyte solution can be circulated, and the outermost generally tubular electrode and the permselective membrane together defining a generally annular outermost electrolyte compartment through which a second electrolyte solution can be circulated.

2. The apparatus according to claim 1 in which the innermost generally tubular electrode comprises the cathode of the cell and the outermost generally tubular electrode comprises the anode of the cell.

3. The apparatus according to claim 1 in which the innermost generally tubular electrode comprises the anode of the cell and the outermost generally tubular electrode comprises the cathode of the cell.

4. The apparatus according to claim 1 in which the generally tubular permselective membrane comprises a tubular sleeve of a cation permeable material.

5. The apparatus according to claim 1 in which the generally tubular permselective membrane comprises a tubular sleeve of an anion permeable material.

6. The apparatus according to claim 1 in which the longitudinally movable scraper means has an annular scraper element adapted to contact the exterior surface of the innermost of the concentrically disposed generally tubular electrodes of the cell, and in which scraper drive means connected to the scraper means are provided for moving the scraper means longitudinally with respect to said innermost tubular electrode.

7. The apparatus according to claim 1 in which the longitudinally movable scraper means has an annular scraper element adapted to contact the interior surface of the outermost of the concentrically disposed generally tubular electrodes of the cell, and in which scraper drive means connected to the scraper means are provided for moving the scraper means longitudinally with respect to said outermost tubular electrode.

8. The apparatus according to claim 1 in which the electrolytic cell is provided with means for circulating a first electrolyte solution through the innermost generally annular electrolyte compartment and with means for circulating a second electrolyte solution through the outermost generally annular electrolyte compartment of the cell.

9. The apparatus according to claim 1 in which the electrolytic cell is provided with a generally tubular housing of imperforate material on which the permselective membrane is mounted, said tubular housing being disposed concentrically between the innermost and the outermost of the concentrically disposed electrodes of the cell and being formed with a plurality of through openfings on the portion thereof on which the tubular permselective membrane is mounted.

10. The apparatus according to claim 1 in which the electrolytic cell is adapted to be at least partly immersed in the solution being purified so that the outermost of the concentrically disposed generally tubular electrodes is totally immersed in said solution.

11. The apparatus according to claim 1 in which the electrolytic cell is provided with an outer housing in which the outermost of the concentrically disposed generally tubular electrodes of the cell is contained, and in which means are provided for introducing the electrolyte solution being purified into the outer housing and for discharging said solution from said outer housing.

12. The apparatus according to claim 1 in which the innermost of the concentrically disposed generally tubular electrodes comprises the cathode of the cell, in which the generally tubular permselective membrane comprises a tubular sleeve of a cation permeable material, in which the outermost of the concentrically disposed generally tubular electrodes comprises the anode of the cell, in which the longitudinally movable scraper means has an annular scraper element adapted to contact the exterior surface of the generally tubular cathode of the cell, and in which scraper drive means connected to the scraper means are provided for moving the scraper means longitudinally with respect to said cathode.

13. The apparatus according to claim 12 in which the cation permeable material from which the permselective membrane is formed comprises a perfluorosulfonic acid resin.

14. The apparatus according to claim 12 in which means are provided for circulating a catholyte solution through the catholyte compartment of the electrolytic cell.

15. The apparatus according to claim 12 in which the scraper drive means comprises pneumatically actuated longitudinally movable piston means mounted above the tubular cathode and connected to the scraper means, and in which scraper drive control means are provided for automatically actuating the scraper drive means at predetermined intervals of time.

16. The apparatus according to claim 12 in which a source of electrolyzing current is electrically connected to the anode and the cathode of the electrolytic cell.

17. The apparatus according to claim 12 in which a generally tubular housing is disposed concentrically with respect to the tubular cathode and is spaced radially outwardly therefrom to define a generally annular catholyte compartment, the upper portion of the tubular housing being substantially imperforate and the lower portion of said housing being formed with a plurality of longitudinally extending openings, and in which the tubular permselective membrane is mounted on the exterior of the lower portion of the tubular housing over the longitudinal openings formed in said housing so that a catholyte solution in the catholyte compartment of the cell is able to contact the interior surface of the permselective membrane.

18. The apparatus according to claim 17 in which the tubular cathode is formed of essentially imperforate material and is closed at its top and bottom ends, the upper end portion of the cathode being formed with a catholyte inlet opening that communicates with the interior of the cathode and the lower end portion of the cathode being formed with a plurality of catholyte outlet openings that communicate with the annular catholyte compartment of the cell, and in which the tubular housing is formed of essentially imperforate material and is closed at its top and bottom ends, the lower portion of the housing being formed with said longitudinally extending openings and the upper end portion of the housing being formed with a catholyte discharge opening, whereby a catholyte solution introduced into the interior of the cathode through the catholyte inlet opening at the upper end of the cathode flows downwardly through the interior of the cathode and outwardly through the catholyte outlet openings at the lower end of the cathode into the annular catholyte compartment and thence upwardly through the catholyte compartment to and through the catholyte discharge opening at the upper end of the housing.

19. The apparatus according to claim 18 in which a catholyte reservoir for receiving and storing a catholyte solution is connected by a conduit to the catholyte discharge opening formed in the upper end of the tubular housing, and in which pump means are connected by conduit to the catholyte reservoir and to the catholyte inlet opening formed in the upper end of the tubular cathode, said pump means being adapted to deliver a catholyte solution from the catholyte reservoir to the catholyte inlet opening of the tubular cathode, said catholyte solution being returned to the catholyte reservoir through the catholyte discharge opening of the tubular housing and the conduit connected thereto.

* * * * *